Jan. 17, 1961 W. I. CRONAN 2,968,157
CLOSED CIRCUIT STEAM TURBINE MARINE MOTOR
Filed May 3, 1956 2 Sheets-Sheet 1

INVENTOR.
WALTER I. CRONAN
BY
Sawyer & Kennedy
ATTORNEYS

Jan. 17, 1961 W. I. CRONAN 2,968,157
CLOSED CIRCUIT STEAM TURBINE MARINE MOTOR
Filed May 3, 1956 2 Sheets-Sheet 2

INVENTOR.
WALTER I. CRONAN
BY
Sawyer & Kennedy
ATTORNEYS

United States Patent Office 2,968,157
Patented Jan. 17, 1961

2,968,157

CLOSED CIRCUIT STEAM TURBINE MARINE MOTOR

Walter I. Cronan, 175 Ames Ave., Leonia, N.J.

Filed May 3, 1956, Ser. No. 582,555

2 Claims. (Cl. 60—108)

This invention relates to marine motors and is more particularly concerned with closed circuit steam turbine marine motors.

Marine engines or motors are generally gasoline driven or diesel, and as a consequence, motive power for small boats is expensive and difficult to handle. The marine motor, such as the conventional outboard types are driven by gasoline fuel, and they are expensive and heavy to handle, relative to the amount of power they generate. In addition, these motors are noisy, and since they are generally of the reciprocating type, their use at full throttle for any sustained period is damaging to the motor. The conventional outboard motors vibrate a great deal, hence their maintenance, upkeep and replacement of parts is a constant problem and expense.

My invention is intended to take advantage of the steam turbine type of motive power. The motor of my invention may be employed either as an inboard marine motor or as the conventional outboard type. For the purposes of this application, I will describe my new motor as the outboard type. Since a steam turbine marine motor has the advantage of operating in a liquid medium (water), a closed circuit steam turbine which can recondense its liquid on a constant basis, becomes substantially self-sustaining. Additionally, the closed circuit steam turbine has the advantage that it is cheaper to build and operate. The motor of my invention has a single major rotary shaft on which all elements are integral, and as a consequence, sustained high speed does not damage the unit, but on the other hand increases the efficiency of the operation.

Other advantages of my motor will become apparent with the description of its construction and operation.

Figure 1:
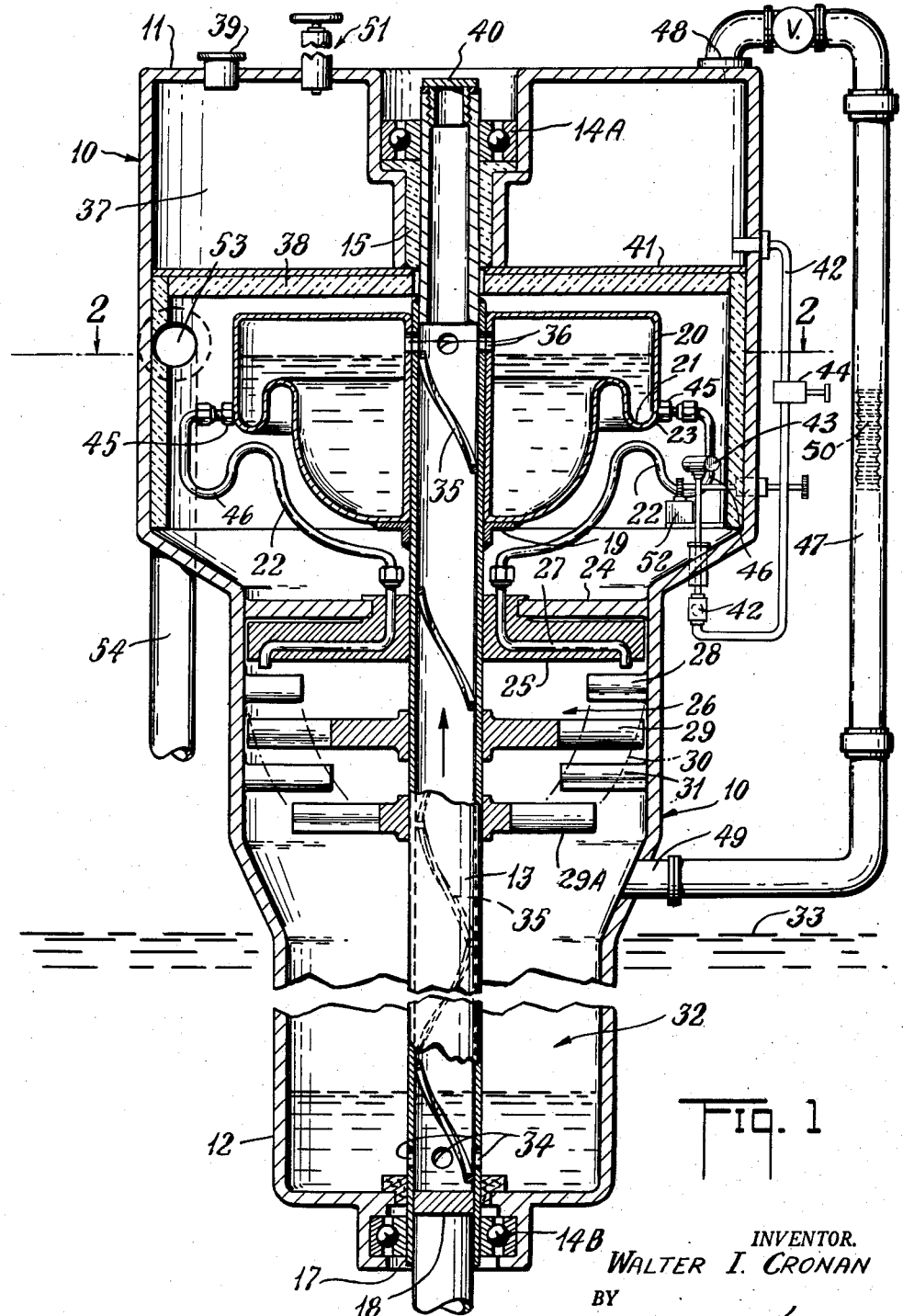
Figure 2:
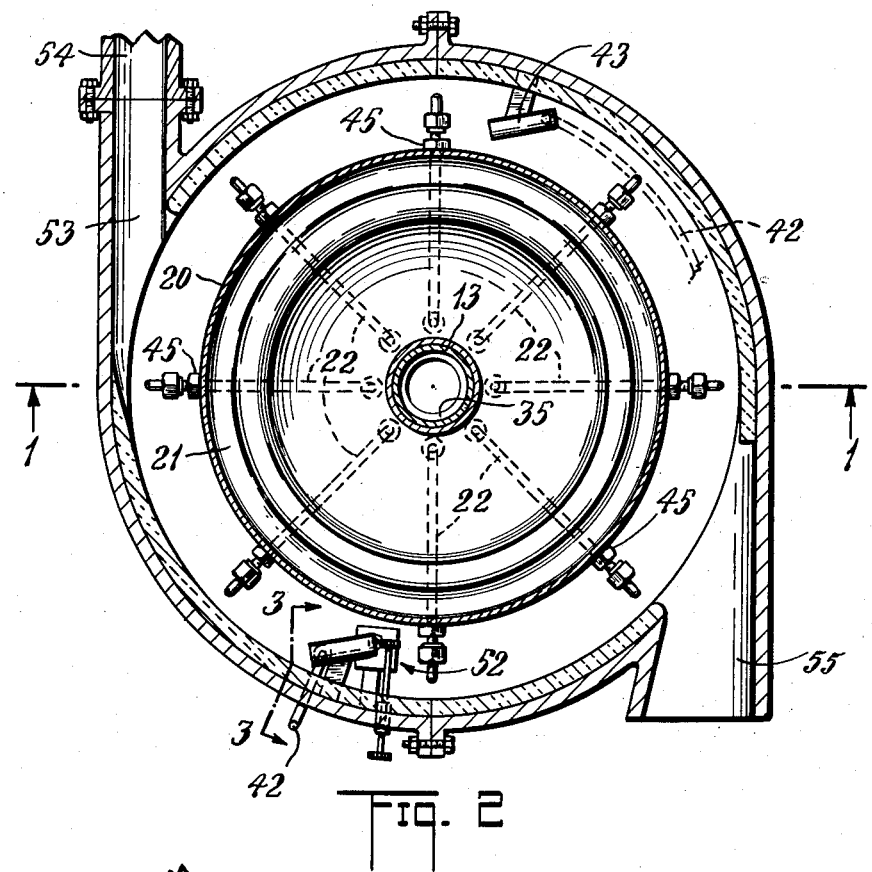
Figure 3:
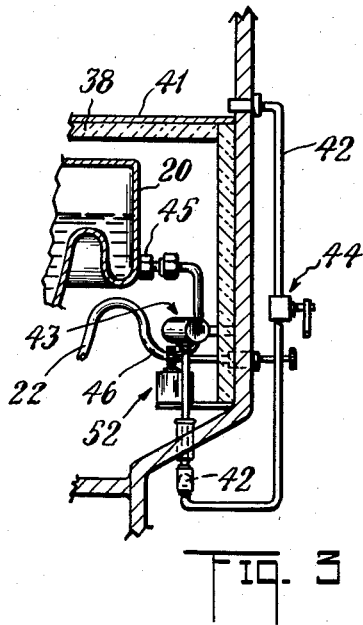

For a better understanding of this invention, reference is made to the drawings in which:

Figure 1 is a side elevation, partly in section, showing the manner in which the parts of the motor are arranged and connected for cooperation; and Figure 2 is a plan view partly in section, of the motor; and Figure 3 is a detail, partly in section of the boiler and heating elements.

The motor of this invention is a steam turbine type having a closed circuit, which comprises a housing 10, which is preferably an elongated tube, circular in shape, having a flat top portion 11 and at its lower portion tapering to a narrow diameter as at 12. A vertical hollow rotor shaft 13 running the entire length of the housing is rotatably mounted in the center of the houshing on bearings 14A at the top of the shaft and 14B at the bottom of the shaft, so that it may rotate inside of and independent of the housing. A heat seal 15, on the outside wall of the shaft and preferably of asbestos or other insulating material serves to insulate and protect the bearings 14A. The shaft 13 is hollow its entire length to the bottom at 17, where a seal 18 serves as a closure for the shaft.

At its upper end, but below the upper bearing 14A, the rotor shaft has a circular shoulder 19 upon which is mounted a circular boiler 20 which is integral with the rotor shaft. Around its outer circumference, the boiler is provided with an entrapment lip 21 for the entrapment of some of the liquid contained in the boiler. A plurality of flash tubes 22, preferably of metal capable of withstanding quick and sustained heat are connected at the lower part of the outer circumference of the boiler as at 23 to allow the liquid in the boiler to flow into the flash tubes 22. These tubes curve around the lower part of the boiler toward the rotor shaft and are conducted through a seal 24 mounted on the shaft 13. After passing through the seal, the flash tubes are solidly imbedded in a metal hub 25 which is also integral with the shaft. This hub supports the flash tubes and holds them in position, and also serves to block off steam from attacking the seal between the flame chamber and the impeller chamber 26. Below the seal the flash tubes are shaped to curve outwardly away from the rotor shaft as at 27 in order to conduct the steam in said tubes against a first stage stator blade 28 which is fixed to the housing 10. A second stage turbine blade 29 is mounted on the rotor shaft below the stator blade, and in the steam path 30. Below the turbine blade there may be provided a guide blade 31 which is integral with the housing 10. The steam path 30 is then directed from the third stage turbine blade 31, mounted on the housing, to a fourth stage impeller blade 29A mounted and fixed upon the rotor shaft 13 and below the third stage turbine blade 31. A condensation chamber 32 below the blades receives the spent steam after it has passed the blades. Since this condensation tank is below the water line 33 when the motor is in operation, the steam will be cooled and soon condensed into water which drops to the lower part of the condenser tank. The rotor shaft 13 which passes through the condenser tank is provided with a series of holes 34 to conduct the condensed liquid into the hollow rotor shaft. On the interior of the shaft a helix rib 35 running around the interior of the shaft and its full length is preferably provided to conduct the condensed liquid upwardly in the shaft to return it to the boiler 20 through the holes 36 in the rotor shaft at its upper end and preferably above the water level of the boiler for further use. In addition, residual steam pressure in the condensation chamber also helps to force the condensed liquid or wet steam up the shaft.

At its upper end, the housing is provided with a fuel tank 37 which surrounds the rotor shaft and is independent of it, and preferably employs the whole space above the boiler. The fuel tank is separated from the boiler by any of the conventional insulating materials such as asbestos 38. A filler cap 39 at the top of the fuel tank provides a means for filling the fuel tank when desired. At the top of the housing a removable cap 40 provides a means for removing water from the rotor or supplying more water as the case may be.

At the lower portion of the fuel tank, preferably just above its bottom 41, fuel supply tubes 42 carry the fuel to a plurality of flame elements 43 which are preferably mounted in a counter-opposed position to throw a jet flame against the flash tubes 22. Throttle means 44 are mounted on the fuel supply tubes to control the supply of fuel being carried to the flame jets. The flame elements are mounted in a fixed position relative to the housing, and do not move with the shaft, the steam boiler and the jet flame tubes. The flame is wrapped around the head by the fan action of the flash tubes which serves to increase the heat transfer contact area from flame to tube.

At the lower end of the rotor shaft below the bearing 14B, any conventional power take-off or gear may be employed to turn the propeller or propellers as the case may be.

In the connection of the flash tubes 22 with the boiler, I preferably employ a balance nut 45 which may be used to provide the proper dynamic balance for each flash tube junction. The flash tubes also are preferably provided with a U-shaped portion 46 below the entrapment lip in the boiler, which provides a moisture entrapment zone in the flash tubes.

In order to provide a means for maintaining or changing the pressure in the fuel tank, a tubing 47 is connected to the fuel tank at its upper portion at 48 and extends down to the condensation chamber at its upper end as at 49. A bellows 50 in the tube 47, which encloses a compressed spring which is braced against the ends thereof and which is loaded against the pressure in the tube 47 from the condensation chamber. The bellows 50, therefore, act as a free floating piston in the tubing 47. When the motor is started, the pressure in the condensation chamber 32 will gradually build up and will enter the tube 47, to press against the bellows 50. As the pressure in the tube 47 increases, the bellows will push upwardly to force the air, vapor or fuel as the case may be upwardly in the tube, to maintain a constant pressure in the fuel tank to force the fuel in the tank into the motor. By means of the bellows in the tube 47, the constant pressure replaces the volume of the gas removed, and the faster the device operates, the harder the bellows will push against the vapor in the fuel tank to displace the fuel used in the operation of the unit.

In order to assure the necessary pressure in the fuel tank for starting or during operation, a hand pressure pump 51 may be provided at the top of the fuel tank.

The flame jets are provided with ignition means 52, which as shown is similar to a standard cigaret lighter whereby a spark is caused by striking a flint to ignite the fuel in the lighter, which in turn ignites the fuel issuing from the flame jets. Any of the conventional starter means for igniting the jets, such as spark gap, resistances, etc. may be employed and which may be actuated from outside of the housing to ignite the fuel issuing from the fuel jet.

The outgoing blast of the heat from the flame jets in the fire chamber is carried out of the chamber through the exhaust 53, which is connected by an exhaust tube 54. The exhaust preferably is carried down along the outside of the housing below the water line so that the heat blast is in the water. This provides an additional thrust to the motor and also serves to blanket the noise of the exhaust. 55 represents the air intake passage to supply the necessary air to the flame elements 43.

In the operation of the turbine motor as described above, the operator should actuate the hand pressure pump 51 to assure proper pressure in the fuel tank. The fuel is normally gasoline, but may be any of a number of fuels used, such as alcohol, butane, etc. When pressure has been obtained in the fuel tank, the pet-cocks or fuel controls on the flame jets are opened to allow the fuel to flow to the jets. When the flow of fuel has commenced, the motor is started by actuating the ignition means 52. The ignition of the first jet flame will in turn quickly ignite the flame of the remaining jets.

With the ignition of the flame, the heat thereby generated will cause the moisture in the flash tubes 22, and the boiler 20, to vaporize and form steam. The steam will be driven down through the flash tubes by the pressure in the tubes and the boiler, and out of the nozzle of the flash tubes against the stator blade which is integral with the housing. After hitting the first stage stator blade 28 which is mounted on the interior of the housing 10, the steam path 30 will be directed against the second stage rotor blade 29, which is mounted upon and fixed integrally with the rotor shaft 13. The steam path 30 is then directed against the third stage stator blade 31 which is mounted on the interior of the housing 10. From the third stage stator blade 31, the steam path 30 is directed to the fourth stage impeller blade 29A mounted upon the rotor shaft 13. The action of the steam pressure in the steam path 30 against the blades as above described will cause the rotor shaft to revolve, which in turn actuates the power take-off to the propeller or propellers.

After the steam has passed the stator blade 32, it will be conducted down into the condensation chamber which is below the water line, and where the steam is cooled and condensed into water. The water in the condensation chamber passes through the apertures in the rotor shaft and is carried upwardly by the helix rib 35 where it is dispersed through the holes 36 in the shaft to return to the boiler 18.

In the boiler, I have preferably provided entrapment lips 21 to retain sufficient liquid in the boiler when the motor is not in use, so that it may be started at any time and have sufficient water in the boiler to produce steam. Similarly the flash tubes 22 are shaped so that some liquid will be retained to provide steam, when the motor is started.

In the operation of the motor of this invention, the rotation of the boiler on the shaft creates centrifugal force on the liquid or heavy steam contained in the boiler. This centrifugal force flings the water or heavy steam out through the jet tubes, to be transformed into dry high temperature steam. This centrifugal action eliminates the need for a pumping system to maintain the flow of liquid into the jet tubes, since the faster the motor operates the greater the centrifugal force which will be generated in the boiler to push the liquid into the tubes. This centrifugal force on the liquid in the boiler thus becomes self-regulating and serves to maintain a constant flow of liquid in the system of the motor no matter the speed of the motor. In addition, the system of construction of the boiler, the flash tubes and return of the liquid through the rotor shaft serves as an automatic balance for the circulation of liquid throughout the motor.

It should be understood that the motor shown in the drawings and described herein is merely for illustration of my invention, and my marine motor is not limited to the specific form as shown.

Having described the marine steam turbine motor, I claim:

1. A marine motor comprising a closed circuit steam turbine having an enclosed housing, a hollow rotatable shaft mounted within said housing, a boiler mounted on the top of said shaft, flash tubes connected to said boiler mounted on said shaft, means to heat the boiler and flash tubes to produce steam pressure in said flash tubes, impeller blades mounted on said shaft and stator blades mounted in said housing below said flash tubes, means for directing the steam path from the flash tubes downwardly against the impeller and stator blades for rotating the shaft, a condensation chamber below said blades for condensing the spent steam to liquid, apertures in the lower part of the hollow shaft to receive the condensed liquid, helix ribs within the cavity of the hollow shaft for carrying the condensed liquid to the boiler.

2. A marine motor comprising a closed circuit steam turbine having an enclosed housing, a hollow rotatable shaft mounted vertically within said housing, a boiler mounted on the top of said housing, flash tubes connected to said boiler mounted on said shaft below the boiler, means for heating the boiler and the flash tubes to produce steam pressure in said flash tubes, impeller blades mounted in said housing below the flash tubes, means for directing the steam path from the flash tubes downwardly against the impeller and stator blades for rotating the shaft, a condensation chamber below said blades for condensing the spent steam to liquid, apertures in the hollow shaft extending into the condensation chamber to receive the condensed liquid into the hollow shaft, helix ribs within said shaft to force the condensed liquid upwardly in the shaft, and means for returning the condensed liquid to the boiler.

References Cited in the file of this patent

UNITED STATES PATENTS

| | | |
|---|---|---|
| 114,781 | Eley | May 16, 1871 |
| 904,951 | Haas | Nov. 24, 1908 |
| 2,079,923 | Pavlecka | May 11, 1937 |
| 2,089,366 | Hansen | Aug. 10, 1937 |
| 2,525,804 | Kellogg | Oct. 17, 1950 |
| 2,771,868 | Knuth | Nov. 1, 1956 |

FOREIGN PATENTS

| | | |
|---|---|---|
| 513,459 | Great Britain | Oct. 12, 1939 |